United States Patent
Prior et al.

(10) Patent No.: US 9,809,479 B2
(45) Date of Patent: Nov. 7, 2017

(54) METHOD AND APPARATUS FOR RESIDENTIAL WATER RECYCLING

(71) Applicant: Tangent Company LLC, Chagrin Falls, OH (US)

(72) Inventors: William C. Prior, Chagrin Falls, OH (US); James E. Bolton, Chagrin Falls, OH (US); Lyle E. Kirman, Cleveland Heights, OH (US); David F. Rath, Dundas (CA); Adam Arnold, Chagrin Falls, OH (US); Glenn Graff, Willoughby, OH (US); Kevin J. Elliott, Burlington (CA)

(73) Assignee: TANGENT COMPANY LLC, Chagrin Falls, OH (US)

( * ) Notice: Subject to any disclaimer, the term of this patent is extended or adjusted under 35 U.S.C. 154(b) by 1312 days.

(21) Appl. No.: 13/690,320

(22) Filed: Nov. 30, 2012

(65) Prior Publication Data
US 2014/0151294 A1    Jun. 5, 2014

(51) Int. Cl.
*C02F 9/00*    (2006.01)
*C02F 1/02*    (2006.01)
(Continued)

(52) U.S. Cl.
CPC .............. *C02F 9/00* (2013.01); *C02F 1/008* (2013.01); *C02F 1/02* (2013.01); *C02F 1/28* (2013.01);
(Continued)

(58) Field of Classification Search
CPC ......... A01K 63/05; C02F 1/008; C02F 1/441; C02F 1/28; C02F 1/283; C02F 1/32;
(Continued)

(56) References Cited

U.S. PATENT DOCUMENTS 3,472,765 A * 10/1969 Okey ................... B01D 61/025
                                                          210/195.2
3,873,445 A    3/1975 Bussard
(Continued)

FOREIGN PATENT DOCUMENTS

EP    1813579    *  8/2007    ............ C02F 1/5245
RU    2135420        8/1999
(Continued)

OTHER PUBLICATIONS

Review of Technologies for the Onsite Treatment of Wastewater in California prepared for the California State Water Resources Control Board; Prepared by Harold Leverenz, et al., Aug. 2002, Part I.
(Continued)

*Primary Examiner* — Dirk Bass
*Assistant Examiner* — Hayden Brewster
(74) *Attorney, Agent, or Firm* — Pearne & Gordon LLP

(57) ABSTRACT

A wastewater recycling system includes a biological reactor having anaerobic, anoxic, and aerobic chambers. A lift station including a pump is operatively connected to the biological reactor. The lift station receives biologically treated liquid from the biological reactor and pumps the liquid from the lift station. A filtration subsystem is operatively connected to the lift station. The filtration subsystem receives and filters the liquid pumped by the lift station. The filtration subsystem includes a salt-rejecting membrane filter comprising a concentrate recirculation conduit operatively connected to recirculate salt-rejecting membrane filter concentrate to a point along the wastewater recycling system upstream of the salt-rejecting membrane filter, thereby forming a salt concentration loop between said point along the wastewater recycling system and the salt-rejecting membrane filter. A post-filtration subsystem is operatively connected to receive salt-rejecting membrane filter permeate,
(Continued)

and comprises a water disinfection system that disinfects the permeate thereby generating potable water.

29 Claims, 4 Drawing Sheets

(51) Int. Cl.
| | |
|---|---|
| C02F 1/00 | (2006.01) |
| C02F 1/28 | (2006.01) |
| C02F 1/32 | (2006.01) |
| C02F 1/44 | (2006.01) |
| C02F 1/46 | (2006.01) |
| C02F 1/469 | (2006.01) |
| C02F 1/76 | (2006.01) |
| C02F 1/78 | (2006.01) |
| C02F 3/12 | (2006.01) |
| C02F 3/22 | (2006.01) |
| C02F 3/30 | (2006.01) |
| C02F 103/00 | (2006.01) |

(52) U.S. Cl.
CPC ............ *C02F 1/283* (2013.01); *C02F 1/32* (2013.01); *C02F 1/441* (2013.01); *C02F 1/442* (2013.01); *C02F 1/46* (2013.01); *C02F 1/4695* (2013.01); *C02F 1/76* (2013.01); *C02F 1/78* (2013.01); *C02F 3/1242* (2013.01); *C02F 3/223* (2013.01); *C02F 3/302* (2013.01); *C02F 2103/002* (2013.01); *C02F 2103/005* (2013.01); *C02F 2209/008* (2013.01); *C02F 2209/03* (2013.01); *C02F 2209/11* (2013.01); *C02F 2209/29* (2013.01); *C02F 2209/40* (2013.01); *C02F 2209/42* (2013.01); *C02F 2303/16* (2013.01); *Y02W 10/15* (2015.05)

(58) Field of Classification Search
CPC .. C02F 1/42; C02F 1/442; C02F 1/445; C02F 1/46; C02F 1/463; C02F 1/4695; C02F 1/52; C02F 1/76; C02F 1/78; C02F 3/04; C02F 3/06; C02F 3/10; C02F 3/12; C02F 3/1215; C02F 3/1242; C02F 3/223; C02F 3/2806; C02F 3/30; C02F 3/301; C02F 3/302; C02F 3/308; C02F 9/00; C02F 2103/002; C02F 2103/005
See application file for complete search history.

(56) References Cited

U.S. PATENT DOCUMENTS

| | | | |
|---|---|---|---|
| 3,950,249 A | | 4/1976 | Eger et al. |
| 4,145,279 A | | 3/1979 | Selby, III |
| 4,210,528 A | | 7/1980 | Coviello et al. |
| 4,246,101 A | | 1/1981 | Selby, III |
| 4,350,587 A | | 9/1982 | Jarrell |
| 4,439,317 A | | 3/1984 | Jarrell |
| 4,812,237 A | | 3/1989 | Cawley et al. |
| 5,622,622 A | * | 4/1997 | Johnson ............ A61L 2/02 210/192 |
| 5,738,781 A | | 4/1998 | Carlson |
| 5,961,830 A | | 10/1999 | Barnett |
| 6,074,551 A | * | 6/2000 | Jones ............ B01D 61/025 210/106 |
| 6,139,744 A | | 10/2000 | Spears et al. |
| 6,299,775 B1 | | 10/2001 | Elston |
| 6,379,546 B1 | | 4/2002 | Braun |
| 6,383,369 B2 | | 5/2002 | Elston |
| 6,406,629 B1 | * | 6/2002 | Husain ............ C02F 3/1268 210/605 |
| 6,635,177 B2 | | 10/2003 | Oswald et al. |
| 6,838,000 B2 | | 1/2005 | Braun |
| 6,974,544 B1 | | 12/2005 | Langlais |
| 7,279,100 B2 | * | 10/2007 | Devine ............ B01D 61/16 210/259 |
| 7,294,272 B2 | | 11/2007 | Ames et al. |
| 7,323,107 B2 | | 1/2008 | Ames et al. |
| 2003/0070986 A1 | | 4/2003 | Braun |
| 2006/0272198 A1 | | 12/2006 | Yoon et al. |
| 2007/0187329 A1 | * | 8/2007 | Moller ............ C02F 1/288 210/670 |
| 2008/0029395 A1 | * | 2/2008 | Fan ............ B01D 61/425 204/627 |
| 2012/0181229 A1 | | 7/2012 | Shinohara et al. |

FOREIGN PATENT DOCUMENTS

| | | | |
|---|---|---|---|
| RU | 2259959 | 9/2005 | |
| RU | 75651 | 8/2008 | |
| RU | 2351551 | 4/2009 | |
| RU | 2403959 | 11/2010 | |
| WO | 0136338 | 5/2001 | |
| WO | WO 2010058187 A2 * | 5/2010 | ............ C02F 9/005 |
| WO | 2011043144 | 4/2011 | |

OTHER PUBLICATIONS

Review of Technologies for the Onsite Treatment of Wastewater in California prepared for the California State Water Resources Control Board; Prepared by Harold Leverenz, et al., Aug. 2002, Part 2.
Review of Technologies for the Onsite Treatment of Wastewater in California prepared for the California State Water Resources Control Board; Prepared by Harold Leverenz, et al., Aug. 2002, Part 3.
Review of Technologies for the Onsite Treatment of Wastewater in California prepared for the California State Water Resources Control Board; Prepared by Harold Leverenz, et al., Aug. 2002, Part 4.
Review of Technologies for the Onsite Treatment of Wastewater in California prepared for the California State Water Resources Control Board; Prepared by Harold Leverenz, et al., Aug. 2002, Part 5.
Review of Technologies for the Onsite Treatment of Wastewater in California prepared for the California State Water Resources Control Board, Prepared by Harold Leverenz, et al., Aug. 2002, Part 6.
Review of Technologies for the Onsite Treatment of Wastewater in California prepared for the California State Water Resources Control Board; Prepared by Harold Leverenz, et al., Aug. 2002, Part 7.
Review of Technologies for the Onsite Treatment of Wastewater in California prepared for the California State Water Resources Control Board; Prepared by Harold Leverenz, et al., Aug. 2002, Part 8.
Review of Technologies for the Onsite Treatment of Wastewater in California prepared for the California State Water Resources Control Board; Prepared by Harold Leverenz, et al., Aug. 2002, Part 9.
MicroSepTec EnviroServer ES Series Specification Book, Revised Sep. 2011; Accessible at http://www.microseptec.com/images/pdfs/booklets/ES%20Spec%20Book.pdf.
Ryabchikov B.E., Sovremennye metody podgotovki vody dlya promyshlennogo i bytovogo ispolzovaniya, Moskva, DeLi prin, 2004, pp. 165-185.
International Search Report and Written Opinion issued in International PCT Application No. PCT/US2013/072183, dated Mar. 27, 2014.

* cited by examiner

US 9,809,479 B2

METHOD AND APPARATUS FOR RESIDENTIAL WATER RECYCLING

BACKGROUND OF THE INVENTION

Field of the Invention

The present invention relates to wastewater treatment, and more particularly to systems and methods for treating and recycling wastewater to generate potable water.

Description of Related Art

It is known to treat wastewater and to generate potable water from wastewater. However, conventional systems often use excessive amounts of chemicals to operate properly and conventional systems often generate large volumes of waste. For example, U.S. Pat. No. 4,246,101 discloses a system that uses deionization as a principal purification technology. This system generates a concentrated waste stream that requires neutralization and disposal. Strong, corrosive chemicals are required to regenerate the deionization system, and unrecycled waste streams would have to be made up by another source (e.g., a municipal water supply). It would be desirable to provide a wastewater recycling system that is capable of treating and recycling wastewater from a residence or other building, to generate potable water from the wastewater for use in the residence or other building, and which addresses one or more of the shortcomings of conventional systems.

BRIEF SUMMARY OF THE INVENTION

The methods, systems and apparatuses discussed below relate to wastewater recycling, and more particularly to the generation of potable water from wastewater with as little water loss from the system as possible. The following summary will provide a basic understanding of some aspects of the methods, systems and apparatuses discussed below. This summary is not an extensive overview and is not intended to delineate the scope of such methods, systems and apparatuses. Its sole purpose is to present some concepts in a simplified form as a prelude to the more detailed description that is presented later.

In accordance with one aspect of the invention, provided is a wastewater recycling system. The system includes a biological reactor having an anaerobic chamber, an anoxic chamber, and an aerobic chamber. A lift station comprising a pump is operatively connected to the biological reactor. The lift station receives biologically treated liquid from the biological reactor and pumps the biologically treated liquid from the lift station. A filtration subsystem is operatively connected to the lift station. The filtration subsystem receives and filters the biologically treated liquid pumped by the lift station. The filtration subsystem includes a salt-rejecting membrane filter comprising a concentrate recirculation conduit operatively connected to recirculate salt-rejecting membrane filter concentrate to a point along the wastewater recycling system upstream of the salt-rejecting membrane filter, thereby forming a salt concentration loop between said point along the wastewater recycling system and the salt-rejecting membrane filter. A post-filtration subsystem is operatively connected to receive salt-rejecting membrane filter permeate. The post-filtration subsystem comprises a water disinfection system that disinfects the salt-rejecting membrane filter permeate thereby generating potable water.

In certain embodiments, the point along the wastewater recycling system is downstream of the anaerobic chamber, the anoxic chamber, and the aerobic chamber. In further embodiments, the salt-rejecting membrane filter concentrate is recirculated to the lift station.

In certain embodiments, the anaerobic chamber is operatively connected to supply liquid to the anoxic chamber, and the anaerobic chamber is adapted for anaerobically treating wastewater within the anaerobic chamber. The anoxic chamber is operatively connected to receive liquid from both of the anaerobic chamber and the aerobic chamber, wherein the anoxic chamber is adapted for anoxically treating the liquid received from both of the anaerobic chamber and the aerobic chamber within the anoxic chamber thereby biologically removing nitrates from the liquid treated within the anoxic chamber. The aerobic chamber is operatively connected to recirculate aerobically treated liquid to the anoxic chamber, and the anoxic chamber and the aerobic chamber include sludge return conduits respectively connected to transport sludge from the anoxic and aerobic chambers to the anaerobic chamber.

In certain embodiments, the water disinfection system comprises an advanced oxidation system operatively connected to receive the salt-rejecting membrane filter permeate. The advanced oxidation system produces hydroxyl radicals within the salt-rejecting membrane filter permeate. In further embodiments, the advanced oxidation system is configured to add an oxidizing agent to the salt-rejecting membrane filter permeate, and the advanced oxidation system comprises an ultraviolet light generator that irradiates the oxidizing agent within the salt-rejecting membrane filter permeate. In still further embodiments, the ultraviolet light generator comprises a 185 nm lamp.

In certain embodiments, the filtration subsystem includes a chemical cleaning system operatively connected to the salt-rejecting membrane filter and configured to expose the salt-rejecting membrane filter to a cleaning solution, thereby producing a cleaning waste liquid. The filtration subsystem further comprises a waste conduit operatively connected to recirculate the cleaning waste liquid to the biological reactor for biological treatment in the biological reactor. In further embodiments, the cleaning solution is acidic and comprises citric acid and a biodegradable detergent.

In certain embodiments, the filtration subsystem includes a preliminary membrane filter operatively connected to the salt-rejecting membrane filter so as to supply preliminary membrane filter permeate to the salt-rejecting membrane filter for further filtering by the salt-rejecting membrane filter. The preliminary membrane filter comprises another concentrate recirculation conduit operatively connected to recirculate preliminary membrane filter concentrate to said or another point along the wastewater recycling system. In further embodiments, the preliminary membrane filter concentrate is recirculated to the lift station. In further embodiments, the filtration subsystem includes an adsorbent, operatively connected between the preliminary membrane filter and the salt-rejecting membrane filter so as to receive the preliminary membrane filter permeate. The adsorbent is adapted for removing organic molecules from the preliminary membrane filter permeate prior to filtration of the preliminary membrane filter permeate by the salt-rejecting membrane filter. In further embodiments, the salt-rejecting membrane filter comprises a nanofilter or a reverse osmosis device. In further embodiments, the preliminary membrane filter comprises an ultrafilter or a microfilter. In further embodiments, the filtration subsystem includes a salt removal device operatively connected to receive the salt-rejecting membrane filter concentrate. The salt removal device is adapted to remove salts from the salt-rejecting membrane filter concentrate. In further embodiments, an electrochemical device is operatively connected along the salt concentration loop, and the electrochemical device removes salts from a flow stream through the salt concentration loop.

In certain embodiments, the biological reactor includes a biologically-active tertiary filter operatively connected to receive aerobically treated liquid from the aerobic chamber, and the tertiary filter filters and biologically treats the aerobically treated liquid from the aerobic chamber. The biological reactor comprises a tertiary filter backwash conduit operatively connected to recirculate tertiary filter backwash to the anaerobic chamber.

In accordance with another aspect of the invention, provided is a method of recycling wastewater through a system including a biological reactor, a lift station, and a salt-rejecting membrane filter. The biological reactor includes an anaerobic chamber, an anoxic chamber, and an aerobic chamber. The method includes the steps of biologically treating the wastewater in the biological reactor, thereby generating biologically treated liquid; pumping the biologically treated liquid from the biological reactor by the lift station; filtering the biologically treated liquid through a salt-rejecting membrane filter; recirculating salt-rejecting membrane filter concentrate to a point along the system upstream of the salt-rejecting membrane filter, thereby forming a salt concentration loop between said point along the system and the salt-rejecting membrane filter; and disinfecting salt-rejecting membrane filter permeate thereby generating potable water.

In certain embodiments, said point along the system is downstream of the anaerobic chamber, the anoxic chamber, and the aerobic chamber. In further embodiments the salt-rejecting membrane filter concentrate is recirculated to the lift station.

In certain embodiments, the system includes a potable water storage tank, and the method includes the step of storing the potable water in the potable water storage tank.

In certain embodiments, the method includes the steps of transferring liquid from the anaerobic chamber into the anoxic chamber; recirculating liquid from the aerobic chamber into the anoxic chamber; anoxically treating liquid in the anoxic chamber thereby biologically removing nitrates from the liquid treated within the anoxic chamber; aerobically treating liquid within the aerobic chamber; and transferring sludge from both of the anoxic chamber and the aerobic chamber into the anaerobic chamber. In further embodiments, the aerobic chamber is a second aerobic chamber, and the biological reactor further includes a first aerobic chamber, and the method further includes the steps of transferring liquid from the anoxic chamber into the first aerobic chamber; transferring liquid from the first aerobic chamber into the second aerobic chamber; and transferring sludge from the first aerobic chamber to the anaerobic chamber.

In certain embodiments, the step of disinfecting the salt-rejecting membrane filter permeate includes generating hydroxyl radicals within the salt-rejecting membrane filter permeate. In further embodiments, the step of disinfecting the salt-rejecting membrane filter permeate comprises adding an oxidizing agent to the salt-rejecting membrane filter permeate and irradiating the oxidizing agent in the salt-rejecting membrane filter permeate with ultraviolet light. In further embodiments, the total organic carbon in the potable water is less than 150 µg/L. In further embodiments, the total organic carbon in the potable water is less than 100 µg/L.

In certain embodiments, the method includes the steps of chemically cleaning the salt-rejecting membrane filter with an acidic solution, thereby producing a cleaning waste liquid; and recirculating the cleaning waste liquid to the biological reactor for biological treatment in the biological reactor. In certain embodiments, at least 80% of the wastewater is recycled into potable water. In certain embodiments, at least 90% of the wastewater is recycled into potable water. In certain embodiments, at least 95% of the wastewater is recycled into potable water.

In certain embodiments, the method includes filtering the biologically treated liquid through a preliminary membrane filter prior to filtering the biologically treated liquid through the salt-rejecting membrane filter; and recirculating preliminary membrane filter concentrate to said or another point along the system. In further embodiments, the method includes the step of removing, by an adsorbent, organic molecules from preliminary membrane filter permeate prior to filtration of the preliminary membrane filter permeate by the salt-rejecting membrane filter. In further embodiments, the method includes the step of removing, by an electrochemical device, salts from a flow stream through the salt concentration loop.

In accordance with another aspect of the invention, provided is a wastewater recycling system including a biological reactor. The biological reactor includes an anaerobic chamber, an anoxic chamber, and an aerobic chamber. A filtration subsystem, operatively connected to the biological reactor, receives and filters biologically treated liquid from the biological reactor. The filtration subsystem includes a preliminary membrane filter, a salt-rejecting membrane filter, and a chemical cleaning system. The preliminary membrane filter is operatively connected to the salt-rejecting membrane filter so as to supply preliminary membrane filter permeate to the salt-rejecting membrane filter for further filtering by the salt-rejecting membrane filter. The chemical cleaning system is operatively connected to at least one of the preliminary membrane filter and the salt-rejecting membrane filter, and is configured to expose the at least one of the preliminary membrane filter and the salt-rejecting membrane filter to a cleaning solution, thereby producing a cleaning waste liquid. The filtration subsystem comprises a waste conduit operatively connected to recirculate the cleaning waste liquid to the biological reactor for biological treatment in the biological reactor. A post-filtration subsystem is operatively connected to receive salt-rejecting membrane filter permeate. The post-filtration subsystem comprises a water disinfection system that disinfects the salt-rejecting membrane filter permeate thereby generating potable water.

In certain embodiments, the cleaning solution is acidic. In further embodiments, the cleaning solution comprises citric acid and a biodegradable detergent.

In certain embodiments, the cleaning solution is alkaline. In further embodiments, the cleaning solution comprises a biodegradable detergent.

In certain embodiments, the post-filtration subsystem comprises a potable water storage tank storing the potable water. The wastewater recycling system is configured to back flush the preliminary membrane filter with the potable water from the potable water storage tank, and recirculate back flush water to the biological reactor through said or another waste conduit. In further embodiments, the cleaning waste liquid and the back flush water are recirculated to the anaerobic chamber of the biological reactor.

In certain embodiments, the filtration subsystem further comprises an adsorbent, operatively connected between the preliminary membrane filter and the salt-rejecting membrane filter so as to receive the preliminary membrane filter permeate. The adsorbent removes organic molecules from the preliminary membrane filter permeate prior to filtration of the preliminary membrane filter permeate by the salt-rejecting membrane filter.

In certain embodiments, the filtration subsystem further comprises a salt removal device operatively connected to receive salt-rejecting membrane filter concentrate. The salt removal device is adapted to remove salts from the salt-rejecting membrane filter concentrate.

In certain embodiments, the wastewater recycling system further comprises a salt concentration loop, wherein salt-rejecting membrane filter concentrate is recirculated within the wastewater recycling system through the salt concentration loop. The wastewater recycling system further comprises an electrochemical device operatively connected along the salt concentration loop. The electrochemical device removes salts from a flow stream through the salt concentration loop.

In certain embodiments, the preliminary membrane filter comprises one of a microfilter and an ultrafilter.

In accordance with another aspect of the invention, provided is a method of recycling wastewater through a system. The system includes a biological reactor, a preliminary membrane filter, and a salt-rejecting membrane filter. The biological reactor includes an anaerobic chamber, an anoxic chamber, and an aerobic chamber. The method includes the steps of biologically treating the wastewater in the biological reactor, thereby generating biologically treated liquid; filtering the biologically treated liquid through the preliminary membrane filter and then through the salt-rejecting membrane filter; chemically cleaning at least one of the preliminary membrane filter and the salt-rejecting membrane filter with a cleaning solution, thereby producing a cleaning waste liquid; recirculating the cleaning waste liquid to the biological reactor for biological treatment in the biological reactor; and disinfecting salt-rejecting membrane filter permeate thereby generating potable water.

In certain embodiments, the cleaning solution comprises citric acid and a biodegradable detergent.

In certain embodiments, the system includes a potable water storage tank, and the method includes the step of storing the potable water in the potable water storage tank.

In certain embodiments, the method includes the steps of back flushing the preliminary membrane filter with potable water from the potable water storage tank; and recirculating back flush water to the biological reactor for biological treatment in the biological reactor. In further embodiments, the cleaning waste liquid and the back flush water are recirculated to the anaerobic chamber of the biological reactor.

In certain embodiments, the method includes the step of removing, by an adsorbent, organic molecules from preliminary membrane filter permeate prior to filtration of the preliminary membrane filter permeate by the salt-rejecting membrane filter.

In certain embodiments, the method includes the steps of recirculating salt-rejecting membrane filter concentrate to a point along the system upstream of the salt-rejecting membrane filter, thereby forming a salt concentration loop between said point along the system and the salt-rejecting membrane filter; and removing, by an electrochemical device, salts from a flow stream through the salt concentration loop. In certain embodiments, at least 80% of the wastewater is recycled into potable water. In certain embodiments, at least 90% of the wastewater is recycled into potable water. In certain embodiments, at least 95% of the wastewater is recycled into potable water.

In accordance with another aspect of the invention, provided is a multi-chambered biological reactor tank for biologically treating wastewater. The biological reactor tank includes an anaerobic chamber, an anoxic chamber, an aerobic chamber, and a biologically-active tertiary filter. The anaerobic chamber is operatively connected to supply liquid to the anoxic chamber, and the anaerobic chamber is adapted for anaerobically treating wastewater within the anaerobic chamber. The anoxic chamber is operatively connected to receive liquid from both of the anaerobic chamber and the aerobic chamber, wherein the anoxic chamber is adapted for anoxically treating the liquid received from both of the anaerobic chamber and the aerobic chamber within the anoxic chamber thereby biologically removing nitrates from the liquid treated within the anoxic chamber. The aerobic chamber is operatively connected to recirculate aerobically treated liquid to the anoxic chamber. The anoxic chamber and the aerobic chamber include sludge return conduits respectively connected to transport sludge from the anoxic and aerobic chambers to the anaerobic chamber. The tertiary filter is operatively connected to receive aerobically treated liquid from the aerobic chamber, and the tertiary filter is adapted to filter and biologically treat the aerobically treated liquid from the aerobic chamber.

In certain embodiments, the tertiary filter comprises a ceramic filtration media.

In certain embodiments, the multi-chambered biological reactor tank further comprises an air scour subsystem that performs a subsurface air scour of the tertiary filter.

In certain embodiments, the multi-chambered biological reactor tank includes an air-lift pump configured to recirculate the aerobically treated liquid from the aerobic chamber to the anoxic chamber.

In certain embodiments, the multi-chambered biological reactor tank includes a lift station chamber comprising a pump configured to pump tertiary filter filtrate out of the biological reactor tank. In further embodiments, the biological reactor includes a tertiary filter backwash conduit operatively connected to recirculate tertiary filter backwash to the anaerobic chamber.

In certain embodiments, the anaerobic chamber comprises a submersible pump that transfers liquid from the anaerobic chamber to the anoxic chamber. In further embodiments, the aerobic chamber is a second aerobic chamber and the biological reactor tank further comprises a first aerobic chamber. The anoxic chamber is operatively connected to supply liquid to the first aerobic chamber, the first aerobic chamber is operatively connected to supply liquid to the second aerobic chamber, and the first aerobic chamber includes a further sludge return conduit connected to transport sludge from the first aerobic chamber to the anaerobic chamber.

In accordance with another aspect of the invention, provided is a method of treating wastewater in a multi-chambered biological reactor tank. The multi-chambered biological reactor tank includes an anaerobic chamber, an anoxic chamber, an aerobic chamber, and a biologically-active tertiary filter. The method includes the steps of anaerobically treating the wastewater in the anaerobic chamber; transferring liquid from the anaerobic chamber into the anoxic chamber; recirculating liquid from the aerobic chamber into the anoxic chamber; anoxically treating liquid in the anoxic chamber thereby biologically removing nitrates from the liquid treated within the anoxic chamber; aerobically treating liquid within the aerobic chamber; transferring sludge from both of the anoxic chamber and the aerobic chamber into the anaerobic chamber; transferring aerobically treated liquid from the aerobic chamber to the tertiary filter; and filtering and biologically treating the aerobically treated liquid in the tertiary filter.

In certain embodiments, the multi-chambered biological reactor tank further comprises a lift station chamber and a tertiary filter chamber, and the method further includes the steps of transferring tertiary filter filtrate from the tertiary filter chamber to the lift station chamber; and pumping the tertiary filter filtrate in the lift station chamber out of the biological reactor tank. In further embodiments, the nitrogen concentration in the tertiary filter filtrate is not greater than 10 mg/L.

In certain embodiments, the method further includes the steps of backwashing the tertiary filter; and recirculating tertiary filter backwash to the anaerobic chamber.

In certain embodiments, the aerobic chamber is a second aerobic chamber, and the multi-chambered biological reactor tank further comprises a first aerobic chamber, and the method further includes the steps of transferring liquid from the anoxic chamber into the first aerobic chamber; transferring liquid from the first aerobic chamber into the second aerobic chamber; and transferring sludge from the first aerobic chamber to the anaerobic chamber.

A fuller understanding of these and other aspects and embodiments of the invention will be had from the following description of the invention and the appended drawings.

DETAILED DESCRIPTION OF THE INVENTION

The disclosed subject matter relates to the treatment and recycling of wastewater and to the generation of potable water from wastewater. The systems and methods disclosed herein can be applied to treat wastewater from a single residence or other building (e.g., an office building, a retail building, etc.) or groups of residences or other buildings. The term "building" is used throughout this disclosure and is intended to refer to both dwellings or residences and other buildings, such as office buildings, retail buildings, etc.

There can be advantages of applying the systems and methods disclosed herein to an individual building, especially an individual residence, rather than multiple buildings. For example, the contents and volume of the wastewater from a single residence can be highly predictable, and the infrastructure of the system can be reduced to a "one pipe out, one pipe in" solution from the individual building.

Figure 1:
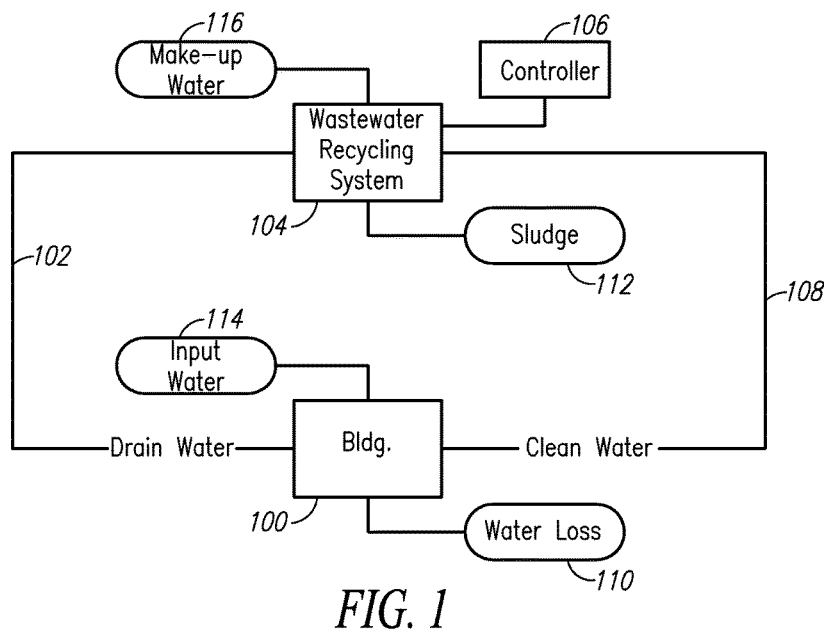
FIG. 1 is a schematic block diagram of an example wastewater recycling system.

An overview of an example wastewater recycling system is shown in FIG. 1. Wastewater from a building 100 flows through a drain line 102 to a wastewater recycling system 104. Portions of the wastewater recycling system 104 can be located at a lower elevation than the building 100 (e.g., buried underground), to allow wastewater to flow through portions of the recycling system 104 by gravity. Alternatively, pumps can be provided where needed to move wastewater, byproducts of wastewater treatment, and potable water to, from and/or within the wastewater recycling system 104. Manual and/or automatic valves can be provided where needed to control the flow of the wastewater, the byproducts of wastewater treatment, and the potable water. A controller 106, for example a microprocessor-based controller (e.g., general purpose computer, special purpose controller, programmable logic controller, etc.) can control various operations of the wastewater recycling system 104, such as activating flushing/washing and cleaning cycles, controlling pumps and valves, monitoring conditions such as turbidity, chlorine levels, liquid levels, etc., monitoring equipment for normal operation and failures, etc. The controller 106 can monitor various instruments (not shown) found in the wastewater recycling system 104, such as turbidity meters, chlorine analyzers, flowmeters, level sensors, pressure sensors, etc. Further, the controller 106 can provide remote telemetry and control capabilities, to allow the wastewater recycling system 104 to be monitored and controlled remotely, such as via the Internet, a landline or mobile phone connection, a radio link, etc.

Wastewater, including both "gray water" and "black water" from the building 100, is collected and purified by the wastewater recycling system 104, to generate potable water (also referred to as "clean" or "finished" water). Thus, the wastewater from the building is recycled to generate potable water, for example water that meets Primary and Secondary Drinking Water Standards as established by the Environmental Protection Agency (EPA). The potable water is supplied to the building though a supply line 108. In an example embodiment, the wastewater recycling system 104 is capable of recycling at least 80% of the wastewater in the system into clean water. That is, the water recovery of the system is at least 80% (at least 80% of the water provided to the wastewater recycling system from the building is recovered as potable water). The water recovery or recycling percentage can be calculated as follows:

$$\% \text{ Recovery} = 100 \times \frac{\text{Supply of potable water from } systemover \text{ a sufficient period of time}}{\text{Used water feeding } systemover \text{ the sufficient period of time}}$$

The sufficient period of time is sufficiently long enough to account for short-term high flow volumes into the wastewater recycling system. Further the recycling or percent recovery calculation assumes that water losses from the system are negligible. In certain embodiments, the wastewater recycling system 104 is capable of recycling at least 90% of the wastewater in the system into clean water. In further embodiments, the wastewater recycling system is capable of recycling at least 95% of the wastewater in the system into potable water. It is expected that the wastewater recycling system could be capable of recycling at least 98% of the wastewater in the system into potable water.

Inevitably, water is lost from the treatment loop shown in FIG. 1 as it is consumed in the building 100 and during wastewater treatment. This water loss is shown schematically as water loss 110 and sludge 112. The sludge 112 represents wet solids that are periodically removed from the wastewater recycling system 104 and discarded. For example, the sludge can be pumped out of the wastewater recycling system 104 after sufficient accumulation. Some water will be added to the system naturally, and such water is shown schematically as input water 114. However, it is expected that the volume of lost water will exceed the volume of input water. Thus, make-up water 116 can be added to replace the lost water.

Figure 2:
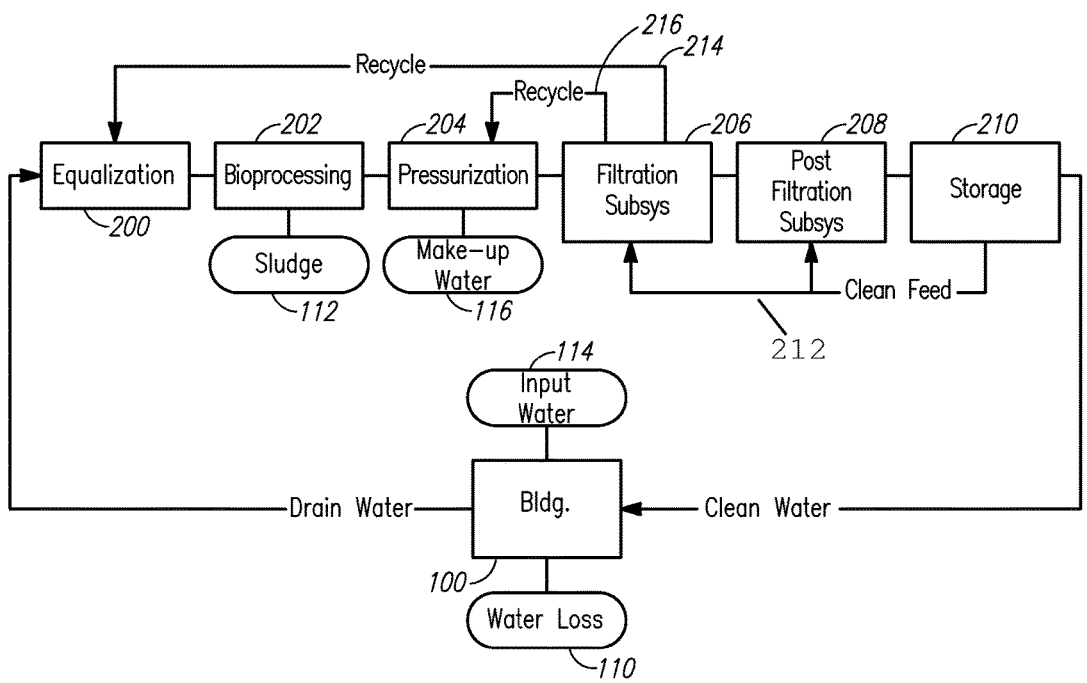
FIG. 2 is a schematic block diagram of the example wastewater recycling system.

A more detailed overview of an example wastewater recycling system is shown in FIG. 2. More specifically, in FIG. 2, the wastewater recycling system 104 of FIG. 1 is conceptually broken down into several different processing blocks that are discussed in detail below. These processing blocks include equalization 200, bioprocessing 202, pressurization 204, filtration by a filtration subsystem 206, post-filtration treatment by a post-filtration subsystem 208, and potable water storage 210. In addition to recycling wastewater for use as potable water within the building 100, the wastewater recycling system includes several internal recirculation or recycle lines. For example, supply line 212 supplies clean water to the filtration subsystem 206 for use in cleaning the filtration subsystem. Supply line 212 can also supply clean water to the post-filtration subsystem 208 if desired, such as for cleaning and/or backwashing a carbon filter or adsorbent in the post-filtration subsystem 208. Recirculation lines 214, 216 allow wastes and concentrates from the filtration subsystem 206 to be internally recycled within the wastewater recycling system. The wastewater recycling system can include additional internal recirculation lines as discussed below. Further, the internal recirculation lines shown in FIG. 2 can comprise multiple separate lines from individual components (discussed below) within the various processing blocks shown in FIG. 2.

Figure 3:
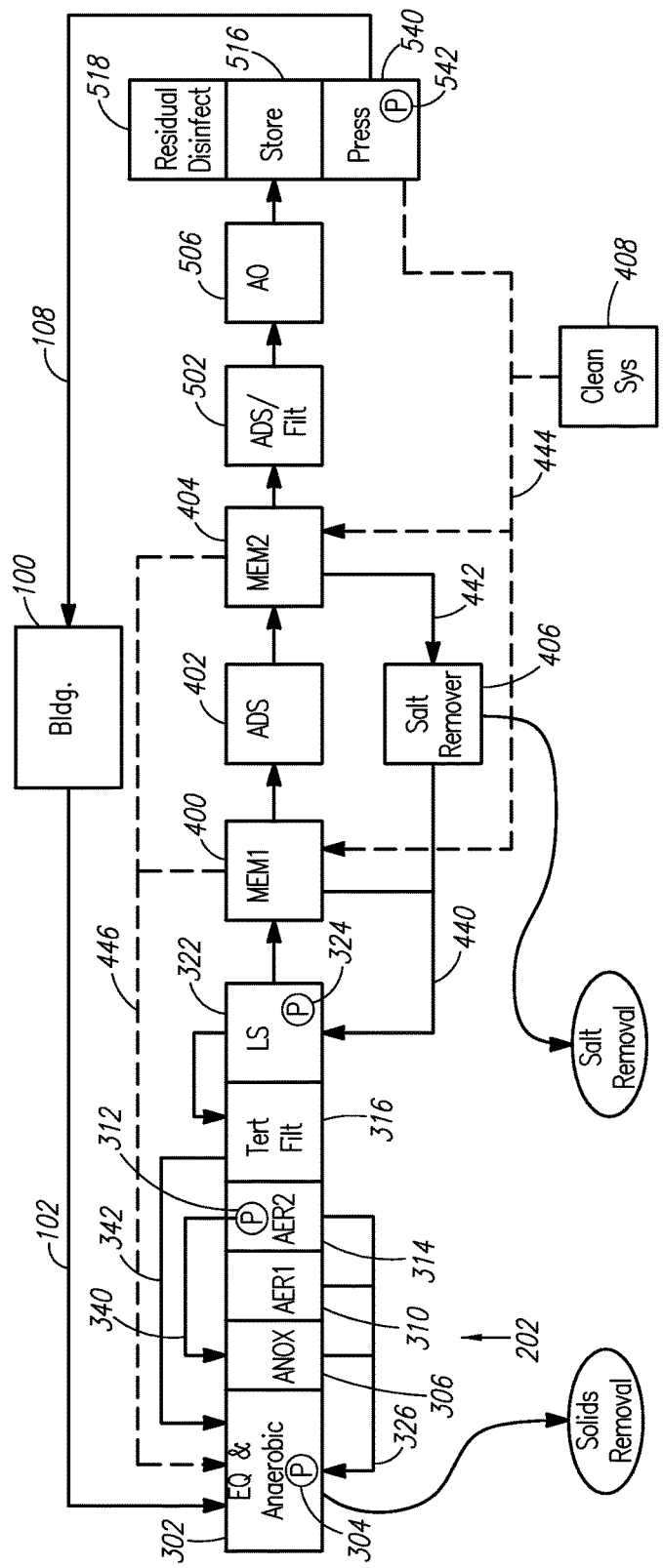
FIG. 3 is a schematic block diagram of the example wastewater recycling system.

A still more detailed overview of an example wastewater recycling system is shown in FIG. 3. In FIG. 3, wastewater from the building 100 flows through the drain line 102 into a combined equalization/anaerobic chamber 302. As used herein, the terms "anaerobic chamber" refer to a chamber in which anaerobic digestion occurs. The terms "anaerobic chamber" refer to anaerobic chambers sized to provide flow equalization (as shown in FIG. 3) and also to anaerobic chambers that are not sized to provide flow equalization.

From the equalization/anaerobic chamber 302, liquid is supplied to an anoxic chamber 306. The liquid can be pumped to the anoxic chamber 306, such as via a submersible grinder pump 304 in the equalization/anaerobic chamber 302. Anoxically-treated liquid is supplied from the anoxic chamber 306 to a first aerobic chamber 310. Aerobically treated liquid is supplied from the first aerobic chamber 310 to a second aerobic chamber 314. Via a return conduit 340, aerobically-treated liquid is recirculated to the anoxic chamber 306. The second aerobic chamber 314 can include an airlift pump 312 for recirculating aerobically-treated liquid to the anoxic chamber 306.

Aerobically-treated liquid from the second aerobic chamber 314 is also supplied to a tertiary filter 316. Filtrate from the tertiary filter 316 is supplied to a lift station 322 comprising a lift station pump 324. The lift station 322 supplies tertiary filter filtrate to downstream portions of the wastewater recycling system. Additionally, the lift station 322 can backwash the tertiary filter 316. Sludge from the anoxic and aerobic chambers is recirculated to the equalization/anaerobic chamber 302 through sludge return conduits 326. Tertiary filter backwash is also recycled to the equalization/anaerobic chamber 302 through tertiary filter backwash conduit 342.

Tertiary filter filtrate is pumped from the lift station 322 to a preliminary membrane filter 400 (e.g., an ultrafilter or a microfilter). Preliminary membrane filter concentrate is recirculated through a concentrate recirculation conduit 440 to a point upstream of the preliminary membrane filter 400, such as to the lift station 322. Preliminary membrane filter permeate is supplied to a salt-rejecting membrane filter 404 through an adsorbent 402. Example salt-rejecting membrane filters include nanofilters and reverse osmosis (RO) units. Salt-rejecting membrane filter concentrate is recirculated through another concentrate recirculation conduit 442 to a point upstream of the salt-rejecting membrane filter 404. For example the salt-rejecting membrane filter concentrate can be recirculated to the lift station 322 or some other point along the wastewater recycling system. The upstream recirculation of salt-rejecting membrane filter concentrate forms a salt concentration loop within the wastewater recycling system. The salt concentration loop is formed between the salt-rejecting membrane filter 404 and the upstream point to which the salt-rejecting membrane filter concentrate is recycled (e.g., the lift station).

A salt removal device 406, for example, an electrochemical device, can be located along the salt concentration loop to remove salts from the flow stream through the salt concentration loop. The salt removal device 406 can be located along the recirculation conduit 442 to remove salts from the salt-rejecting membrane filter concentrate. Alternatively, the salt removal device 406 can be located along the main flow stream through the wastewater recycling system within the salt concentration loop (e.g., between the adsorbent 402 and the salt-rejecting membrane filter 404). In certain embodiments, the salt removal device 406 is located upstream of the salt concentration loop.

Salt-rejecting membrane filter permeate is supplied to an adsorbent or activated carbon filter 502, and subsequently the liquid is disinfected to form potable water. The disinfection can be performed by an advanced oxidation system 506. The potable water is stored in a water storage tank 516. The wastewater recycling system can include residual disinfection 518 for the potable water and a pressurization system 540, including a pump 542, for the potable water. Potable water can be recirculated within the wastewater recycling system for cleaning purposes. For example, potable water can be supplied to the preliminary membrane filter 400 to back flush the filter. Potable water can also be used in combination with a chemical cleaning system 408 to clean the preliminary membrane filter 400 and the salt-rejecting membrane filter 404. A potable water recirculation conduit 444 is shown in FIG. 3. Cleaning waste liquids generated when cleaning the preliminary membrane filter 400 and/or the salt-rejecting membrane filter 404 can be recirculated upstream, such as to the equalization/anaerobic chamber 302. FIG. 3 shows waste conduit 446 for recirculating the cleaning waste liquids.

As shown in FIG. 3, solids can be removed from the equalization/anaerobic chamber 302, and thus from the wastewater recycling system. Salts can be removed from the wastewater recycling system via the salt removal device.

Figure 4:
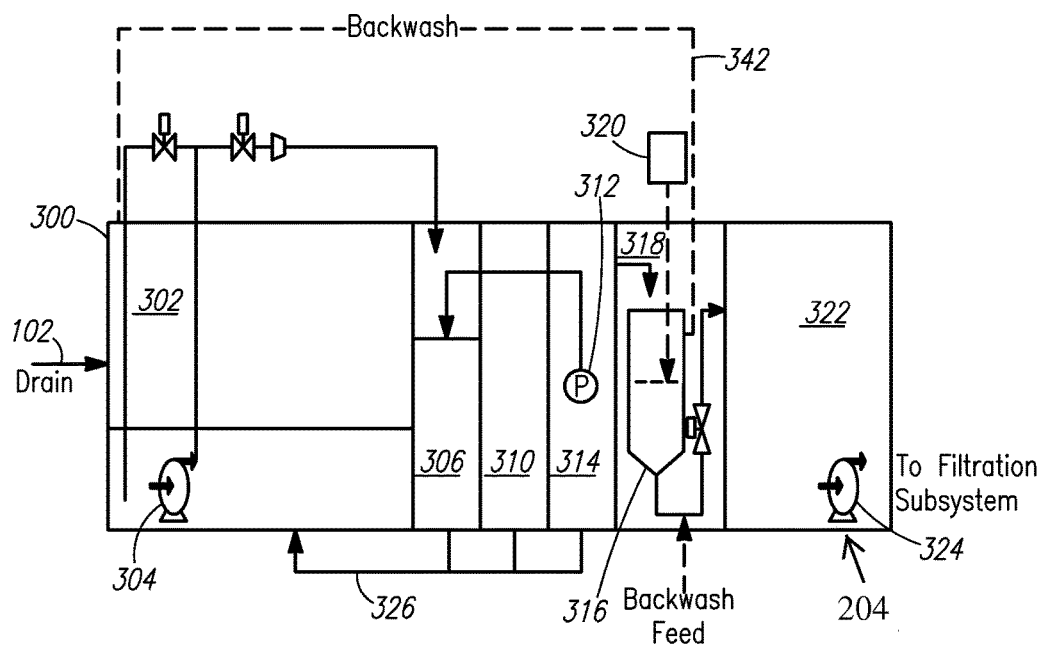
FIG. 4 is a schematic block diagram of a portion of the example wastewater recycling system.

A more detailed schematic diagram of the equalization 200, bioprocessing 202 and pressurization 204 processing blocks of FIG. 2 is provided in FIG. 4. Wastewater from the building 100 (FIG. 1) flows through the drain line 102 into a biological reactor 300. Microorganisms within the biological reactor 300 (e.g., bacteria) biologically treat the wastewater to form settleable solids that settle to the bottom of various treatment chambers within the biological reactor.

The biological reactor 300 includes an equalization/anaerobic chamber 302. Raw wastewater flows into and is collected in the equalization/anaerobic chamber 302, which acts as an equalization or surge tank. Wastewater treatment efficiency, reliability, and control are optimized when the processes are operated at or near uniform conditions; however, the volume and contents of wastewater can vary dramatically throughout a day. For example, flow surges can occur and concentrated chemicals that are toxic to the microorganisms in the biological reactor 300 can be present in the wastewater. The equalization/anaerobic chamber 302 is oversized to handle surges in wastewater flow that exceed the continual treatment capacity (e.g., a rated gal/min or gal/day) of the wastewater recycling system. The equalization/anaerobic chamber 302 is also oversized to dilute toxins in the wastewater. The equalization/anaerobic chamber 302 can be sized to handle one or more days of expected wastewater volume, such as three days for example, to provide a buffer for wastewater surges and the dilution of toxins.

The wastewater is anaerobically treated within the equalization/anaerobic chamber 302. The equalization/anaerobic chamber 302 lacks oxygen (i.e., has no or substantially no oxygen), and anaerobic bacteria within the equalization/anaerobic chamber 302 anaerobically digest organic material in the wastewater. Solids will settle to the bottom of the equalization/anaerobic chamber 302, and oil and grease will float to the surface. The oil and grease can be skimmed and discarded periodically if desired. The equalization/anaerobic chamber 302 can include structures such as walls, baffles, etc. to retain oil and grease within specific portions of the equalization/anaerobic chamber.

Although flow equalization and anaerobic treatment are shown as occurring in a common chamber 302, it is to be appreciated that the biological reactor 300 can have separate equalization and anaerobic chambers.

The equalization/anaerobic chamber 302 is operatively connected to supply liquid to an anoxic chamber 306. A submersible grinder pump 304 pumps partially treated wastewater from the equalization/anaerobic chamber 302 to the anoxic chamber 306. The grinder pump 304 can operate periodically to maintain a relatively constant flow through the wastewater recycling system. The grinder pump 304 can also operate such that the volume of liquid transferred from the equalization/anaerobic chamber 302 is proportional to the flow of wastewater into the equalization/anaerobic chamber.

The anoxic chamber 306 is a low oxygen environment in which liquid is anoxically is treated. The anoxic chamber is operatively connected to receive liquid from both of the equalization/anaerobic chamber 302 and the second aerobic chamber 314. Thus, the anoxic chamber 306 anoxically treats anaerobically treated liquid from the equalization/anaerobic chamber 302 and recirculated, aerobically treated liquid from the second aerobic chamber 314. The anoxic chamber 306 can include a fixed packing within the chamber that helps to maximize microbial growth and microbial contact with the liquid.

Denitrification takes place within the anoxic chamber 306. For example, nitrates and nitrites are biologically reduced and removed from the wastewater by microorganisms in the anoxic chamber 306. The initial nitrification (conversion of ammonia to nitrate) takes place in the aerobic chambers 310, 314 and nitrified liquid is recirculated to the anoxic chamber 306 for denitrification (e.g., conversion to nitrogen gas). It is expected that the wastewater recycling system can reduce the total nitrogen concentration to less than 10 mg/L. For example, the nitrogen concentration in discharge from the biological reactor (e.g., in tertiary filter filtrate discussed below) can be less than or equal to 10 mg/L.

By continuously recirculating from the second aerobic chamber 314 to the anoxic chamber 306, rather than recirculating to the equalization/anaerobic chamber 302, conditions in the equalization/anaerobic chamber 302 are suitable for the settling of solids, the flotation of oil and grease, and the breakdown of toxic household cleaners; all of which diminish the effectiveness of the microorganisms downstream (e.g., microorganisms that are particularly effective in reducing the nitrogen species).

The first aerobic chamber 310 is operatively connected to the anoxic chamber 306 and the second aerobic chamber 314. The first aerobic chamber receives liquid from the anoxic chamber 306 and aerobically treats the liquid. The aerobically treated liquid is transferred to the second aerobic chamber 314 for further aerobic treatment.

The first and second aerobic chambers 310, 314 can include suspended packings within the chambers. The biological reactor 300 can include an airlift pump 312 to recirculate nitrified liquid from the second aerobic chamber 314 to the anoxic chamber 306. It is to be appreciated that the biological reactor can include a single aerobic chamber rather than first and second aerobic chambers, or more than two aerobic chambers. The biological reactor can further include multiple anaerobic and anoxic chambers, if desired.

Sludge from both of the anoxic chamber 306 and the aerobic chambers 310, 314 is transferred (e.g., pumped) to the equalization/anaerobic chamber 302 through sludge return conduits 326. The transfer can occur automatically and frequently. One advantage of transferring sludge to the equalization/anaerobic chamber 302 is that the sludge can be removed at one location (i.e., from the equalization/anaerobic chamber 302), rather than from multiple chambers. Moreover, aerobic digestion of sludge can lead to operational issues and/or a reduction in treatment efficiency, which can be avoided by transferring the sludge from the aerobic chambers 310, 314 to the equalization/anaerobic chamber 302. In conventional onsite systems, sludge is allowed to accumulate in the aerobic chambers and is pumped out on a relatively infrequent basis (i.e. every three to six months; in concurrence with sludge removal from the anaerobic chamber).

It is to be appreciated that one or more of the chambers 302, 306, 310, 314 can employ fixed film biological processes in which a fixed biofilm is present within the chamber.

The biological reactor 300 can include a biologically-active tertiary filter 316. The tertiary filter 316 can be located within a tertiary filter chamber 318. The tertiary filter 316 is operatively connected to receive aerobically treated liquid from the second aerobic chamber 314. The tertiary filter 316 filters and biologically treats the aerobically treated liquid from the second aerobic chamber 314. The tertiary filter 316 is biologically active. Thus, the tertiary filter 316 both filters the liquid from the second aerobic chamber 314 and digests materials within the liquid.

Example filter media for the tertiary filter 316 includes sand, activated carbon, anthracite coal, and engineered products such as a ceramic filtration media. An example engineered ceramic filtration media is MACROLITE engineered ceramic media, supplied by Fairmount Water Solutions of Chardon, Ohio.

An air scour subsystem 320 provides a periodic subsurface air scour of the tertiary filter 316, to prevent a filter cake from forming on the surface and extend filter runtime.

The tertiary filter 316 can be backwashed periodically, such as on a weekly or bi-weekly basis for example. The tertiary filter backwash can be recirculated, via the tertiary filter backwash conduit 342, to the equalization/anaerobic chamber 302 for biological treatment in the biological reactor 300.

The biological reactor 300 can include a lift station chamber 322 that receives the tertiary filter filtrate, and can include a lift station pump 324. The lift station chamber 322 and pump 324 are part of the pressurization processing block 204 shown in FIG. 2. The lift station pump 324 can transfer tertiary filter filtrate from the biological reactor 300 to a filtration subsystem (see FIG. 6).

In an example embodiment, the biological reactor 300 can provide wastewater flow equalization, anaerobic treatment, anoxic treatment, aerobic treatment, aerobic-anoxic recirculation, biological nitrification and denitrification, tertiary filtration, sludge consolidation, lift station or pressurization capabilities, and allow for solids removal, all in a single, packaged biological reactor unit.

Figure 5:
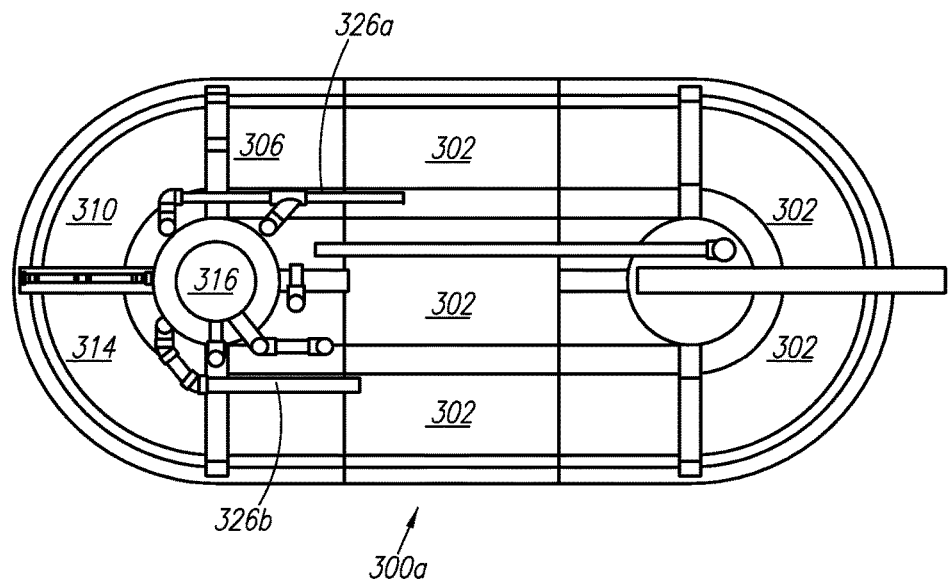
FIG. 5 is a plan view of an example multi-chambered biological reactor tank.

FIG. 5 is a plan view of a multi-chambered biological reactor tank 300a, providing an example biological reactor. The multi-chambered tank includes the equalization/anaerobic chamber 302, first and second aerobic chambers 310, 314, the anoxic chamber 306, the tertiary filter 316 and a lift station chamber (not shown). The lift station chamber can be integral with the tertiary filter chamber, located beneath the tertiary filter chamber, or located elsewhere on the biological reactor tank. The lift station pumps treated liquid (e.g., tertiary filter filtrate) out of the biological reactor tank 300a for further treatment and disinfection downstream of the biological reactor tank.

Sludge return conduits 326a, 326b for recirculating sludge from the aerobic and anoxic chambers to the anaerobic chamber 302 are shown in FIG. 5. The multi-chambered biological reactor tank 300a can be formed as a plurality of individual sections, for example six separate sections. The separate sections can be delivered to a site, such as the location of the building 100 (FIGS. 1-3), and the multi-chambered biological reactor tank 300a can be assembled onsite from the separate sections. The sections can be shipped with various components pre-installed, such as pumps, sensors, and the like. The tank can be designed to permit access to various components installed on the tank. For example, the tank can include manholes to allow components to be accessed after the tank is buried.

Figure 6:
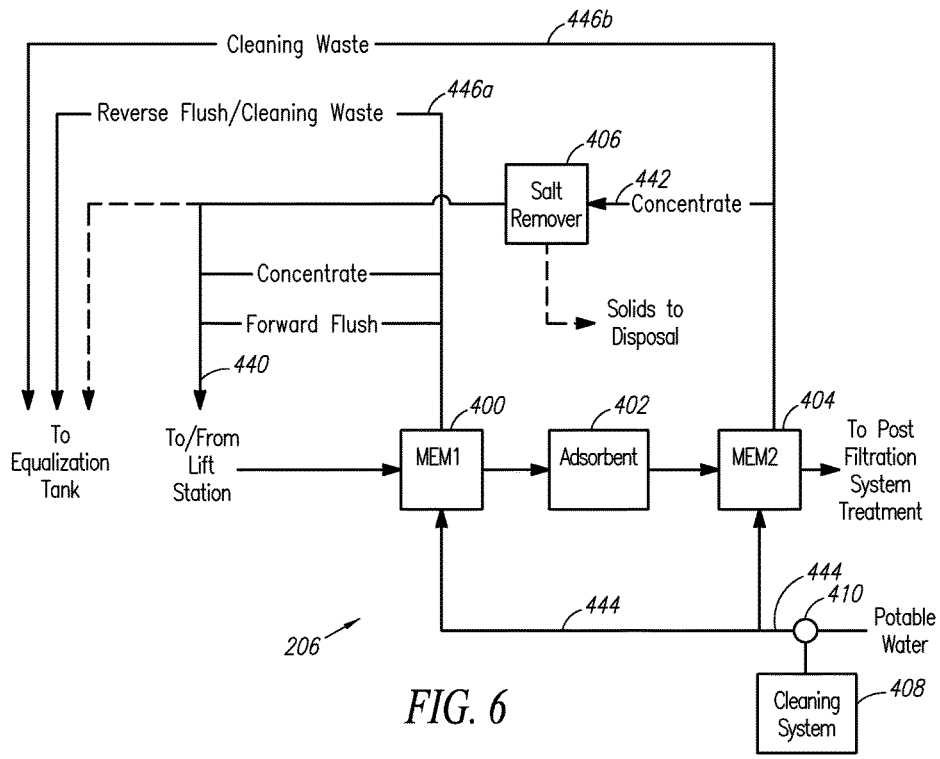
FIG. 6 is a schematic block diagram of a portion of the example wastewater recycling system.

The lift station pump 324 (FIGS. 3-4) supplies tertiary filter filtrate to the filtration subsystem 206 (FIGS. 2 and 6). The filtration subsystem 206 is operatively connected to the biological reactor and to the lift station, to receive and filter the biologically treated liquid pumped from the lift station. FIG. 6 provides a schematic diagram of an example filtration subsystem 206. The example filtration subsystem 206 includes the preliminary membrane filter 400 (such as an ultrafilter or a microfilter) the adsorbent 402, the salt-rejecting membrane filter 404 (such as a nanofilter or an RO unit), and the salt removal device 406 (such as an electrochemical device).

To summarize the operation of the filtration subsystem 206, tertiary filter filtrate is filtered by the preliminary membrane filter 400. The preliminary membrane filter 400 is operatively connected to the salt-rejecting membrane filter 404 through the adsorbent 402, so as to supply preliminary membrane filter permeate to the salt-rejecting membrane filter. The preliminary membrane filter permeate passes through the adsorbent 402 to remove additional organic material, and then through the salt-rejecting membrane filter 404 to remove further organic material and dissolved salts. Salt-rejecting membrane filter permeate is sent to a post-filtration subsystem 208 (FIG. 2) for disinfection and is ultimately made potable. Via a concentrate recirculation conduit 442, the salt-rejecting membrane filter concentrate passes through the salt removal device 406 to extract salts from the concentrate stream, and is recirculated to an upstream point (thereby forming a salt concentration loop). For example, the salt-rejecting membrane filter concentrate can be recirculated to the lift station, forming a salt concentration loop between the lift station and the salt-rejecting membrane filter 404. The salt-rejecting membrane filter concentrate could be recirculated to a different upstream point (other than the lift station), which is also downstream of the anaerobic chamber, anoxic and aerobic chambers. Alternatively, some or all of the salt-rejecting membrane filter concentrate could be recirculated to the equalization/anaerobic chamber 302 (FIG. 3, 4), or another chamber in the biological reactor.

A reason for having a salt concentration loop within the wastewater recycling system, rather than discharging the salt-rejecting membrane filter concentrate out of the system, is to minimize water loss from the system. However, the salt concentration within the salt concentration loop will gradually increase unless diluted or unless salt is removed from the wastewater recycling system. Salt can be removed from the wastewater recycling system directly by the salt removal device 406, or more indirectly, such as by removing solids from the equalization/anaerobic chamber 302 (FIG. 3, 4).

Preliminary membrane filter concentrate is also recirculated within the wastewater recycling system through concentrate recirculation conduit 440. The preliminary membrane filter concentrate can be recirculated to the same point along the wastewater recycling system as the salt-rejecting membrane filter concentrate (e.g., to the lift station), or to another point along the wastewater recycling system (e.g., to the equalization/anaerobic chamber). Thus, the preliminary membrane filter concentrate and the salt-rejecting membrane filter concentrate can, but need not, be recirculated to the same point along the wastewater recycling system. Flush water generated when flushing the preliminary membrane filter, such as during a fast forward flush, can also be recirculated within the wastewater recycling system through the concentrate recirculation conduit 440. Flush water can be recirculated to the same point along the wastewater recycling system as the preliminary membrane filter concentrate, or to another point (e.g., to the equalization/anaerobic chamber).

The filtration subsystem 206 includes a chemical cleaning system 408 for exposing the preliminary membrane filter 400 and the salt-rejecting membrane filter 404 to cleaning solutions to clean the filters. Potable water is recirculated to clean the preliminary membrane filter 400 and the salt-rejecting membrane filter 404, and the chemical cleaning system 408 adds dilute chemical cleaning solutions to the potable water. The chemical cleaning system 408 can include an eductor 410 for drawing cleaning solution into the flow of cleaning water. Cleaning water is supplied to the preliminary membrane filter 400 and the salt-rejecting membrane filter 404 through water recirculation conduit 444. Cleaning the preliminary membrane filter 400 and the salt-rejecting membrane filter 404 produces cleaning waste liquids. The cleaning waste liquids from the preliminary membrane filter 400 are recirculated within the wastewater recycling system through waste conduit 446a, and cleaning waste liquids from the salt-rejecting membrane filter 404 are recirculated through waste conduit 446b. It is to be appreciated that the cleaning waste liquids can be recirculated via one or more common conduits 446 (FIG. 3) that are shared by the preliminary membrane filter 400 and the salt-rejecting membrane filter, or by separate conduits 446a, 446b as schematically shown in FIG. 6. Further, the cleaning waste liquids and the preliminary membrane filter concentrate and/or the salt-rejecting membrane filter concentrate can be recirculated via one or more common conduits. The cleaning wastes can be recirculated to the equalization/anaerobic chamber for biological treatment within the biological reactor, or to some other point along the wastewater recycling system (e.g., to the anoxic chamber, an aerobic chamber, the lift station chamber, etc.) One or both of the preliminary membrane filter 400 and the salt-rejecting membrane filter 404 can be back flushed with clean water without the addition of cleaning solutions, and the waste liquid from back flushing can be recirculated within the wastewater recycling system, such as to the equalization/anaerobic chamber.

In an example filtration subsystem 206, preliminary membrane filter permeate passes directly to the salt-rejecting membrane filter 404, without passing through the adsorbent 402. In another example filtration subsystem 206, salt-rejecting membrane filter concentrate is recirculated within the salt concentration loop, without treatment by the salt removal device 406.

A more detailed discussion of the operation of the filtration subsystem 206 is provided below.

Liquid from the biological reactor 300 (FIG. 4), e.g., tertiary filter filtrate, is filtered by a membrane in the preliminary membrane filter 400. Preliminary membrane filter permeate is then treated by the adsorbent 402 and further filtered in the salt-rejecting membrane filter 404. Preliminary membrane filter concentrate is recirculated within the wastewater recycling system as discussed above.

Example preliminary membrane filters include ultrafilters and microfilters. The membrane of the preliminary membrane filter 400 can be a hollow fiber type with feed entering and concentrate leaving from the inside of a tube, and the permeate leaving on the outside of the tube (inside->outside operation). An example pore size for the membrane of the preliminary membrane filter 400 is between 0.01 and 0.1 microns, such as nominally 0.02 microns. At 0.02 microns, pores of this size are a barrier to bacteria, cysts and viruses.

In certain embodiments, the preliminary membrane filter 400 membrane is operated as a cross-flow filter, thus providing a continuous flow through a lumen, while the filtered permeate leaves through the wall of the tube. Cross-flow mode reduces the likelihood of the tube plugging with solids and reduces the rate of membrane fouling. It is to be appreciated that the preliminary membrane filter 400 need not be operated as a cross-flow filter, but could be operated as a dead-end filter for example.

In order to further slow the fouling of the preliminary membrane filter 400 membrane surface, with corresponding reductions in permeate flux rates, the membrane is periodically mechanically cleaned by fast flushes and back flushes (reverse flushes). During a fast flush, the flow through the preliminary membrane filter 400 continues in the normal, forward service direction, but at a much higher than normal flow rate. Example normal flow velocities can be in the range of 2-4 m/minute, with fast flushes being greater than 12 m/minute. This higher flow rate causes some turbulence which dislodges solids on the filter membrane surface and also sweeps them away. During a back flush, a flow (e.g., potable water) is sent in the reverse direction through the membrane (e.g., from the outside of the tube to the inside of the tube). The back flushes clear partly blocked or occluded pores and allow the solids to be flushed away. Example back flush flow rates can be in the range of 1-3 liters per minute per square meter of membrane. Fast flushes and/or back flushes can be performed frequently if desired, such as one or more times per hour.

Part or all of the fast flush or back flush volume can be recycled upstream of the preliminary membrane filter 400 via conduits 440 and/or 446a. For example, the fast flush volume can be recirculated to a point downstream of the aerobic chamber, such as to the lift station. Back flush volumes can be sent to the equalization/anaerobic chamber 302 for further biological treatment in the biological reactor. In particular, it can be useful to recycle portions of the flushes that have a high concentration of suspended solids to the equalization/anaerobic chamber 302, because it allows the biological treatment system a second chance to break such solids down into carbon dioxide, water and other non-solid wastes like nitrogen and methane.

In addition to the mechanical cleaning steps described above (fast flush and back flush), the membranes of the preliminary membrane filter 400 can also be periodically cleaned with a chemical solution. Cleaning can be initiated automatically (e.g., by the controller 106 in FIG. 1) without the need for an operator to be present.

The applicants have developed dilute, inexpensive cleaning chemicals that are compatible with and can be returned to the equalization/anaerobic chamber 302 (FIGS. 3-4) and/or other portions of the biological treatment system. Any residuals that remain in the water after biological treatment are also fully compatible with potable water.

A chemical cleaning system 408 for cleaning the preliminary membrane filter 400 and/or the salt-rejecting membrane filter 404 is shown schematically in FIG. 6. The chemical cleaning cycle begins with stopping the normal processing of water. The cleaning cycle generally comprises four steps. Step 1 is the introduction of a cleaning chemical in reverse flow (from the permeate side of the membrane to the concentrate side of the membrane). Step 1 continues until the membrane and its housing are completely filled with the cleaning solution. A dilute cleaning solution can be used to clean the preliminary membrane filter 400. However, in order to reduce the amount of space required and the volume of cleaning solution required on site, a concentrated cleaning solution can be drawn into the flow going to the membrane and diluted to the proper strength by an eductor 410.

Step 2 is a soak cycle that can last for one or more hours. Soaking the filter with cleaning solution creates a cleaning waste liquid that is flushed from the filter after the soaking. At the end of the soak time, Step 3 comprises a reverse flush of sufficient volume to ensure that the permeate side of the membrane has no more cleaning solution in it. This is followed by Step 4 which is a fast forward flush to expel any cleaning solution and/or solids that remain inside the filter tubes. All flows of cleaning waste from the cleaning cycle can be recycled back to the equalization/anaerobic chamber 302 (FIG. 3) via the waste conduits, except for the final forward flush which can be directed to the lift station chamber 322.

Because the feed water to the preliminary membrane filter 400 is biologically active, its membrane becomes fouled with a film of non-living organic material and also living biological organisms. The majority of the living organisms are of a type that excretes a slime composed of muco-polysaccharides. The slime allows the organisms to adhere to the surface of the membrane and also to each other in an agglomerated mass known as zooglea. This combination of organic, film-forming material and zooglea presents a difficult cleaning problem. It has been found that sodium metasilicate is a particularly effective cleaner for these foulants. It dissolves the organic film, kills the living organisms due to the high pH environment, and breaks up the gelatinous slime that causes the organisms to agglomerate together. A diluted cleaning solution for the preliminary membrane filter 400 (or the salt-rejecting membrane filter 404) comprises 3 g/L of sodium metasilicate, and 1 ml/L of a biodegradable detergent. This alkaline solution has a pH of about 12, which is biocidal. Sodium metasilicate is a chemical that is commonly used in municipal drinking water systems for pH adjustment and as a corrosion inhibitor. Most waters in the US already have some silica in them in concentrations from <1 to over 50 mg/L, so sodium metasilicate is not a material that is unnatural or unusual in drinking water. When used in the manner described above and with a chemical cleaning frequency of once per week or less, it is expected that this cleaning chemical will add <8 mg/L of silica to the finished water.

In an embodiment, the preliminary membrane filter 400 removes all solids>0.02 microns in size and also any organic molecules that have a molecular weight that is greater than 2,000-5,000 Daltons. However, there are still organic molecules of lesser molecular weight that can foul membranes in the salt-rejecting membrane filter 404. It was found that the offensive organic materials have an amber color and that their concentration is highly correlated with the Total Organic Carbon (TOC) concentration and also with a standard water test for color. In order to reduce the fouling of the salt-rejecting membrane filter membranes and the frequency of membrane cleanings, a long-lived or regenerable adsorbent 402 can be used to remove the offending organic molecules from the preliminary membrane filter permeate. After much study and testing, it was found that a media manufactured by the SolmeteX Co. of Northborough, Mass. (a division of Layne Christensen Co.) called LayneRT was particularly effective for this purpose. Another suitable adsorbent is ASM-10-HP manufactured by ResinTech Inc. of West Berlin, N.J. Another possible adsorbent is Purolite A860 manufactured by Purolite Co. of Bala Cynwyd, Pa.

LayneRT was developed for and is usually used as a media to remove arsenic from potable drinking water, not for organic removal. It comprises a strong base resin that is impregnated with insoluble iron oxide (ferric hydroxide). Testing showed that LayneRT was effective in protecting nanofilter membranes for 2,500-3,500 bed volumes. A single cubic foot of LayneRT could treat 18,000-26,000 gallons of preliminary membrane filter permeate before it was exhausted. For an example residential application, this can correspond to 3 months of operation. It was also found that the organics removed by LayneRT could effectively be removed by a solution of sodium hydroxide. In this case, the adsorbent media is regenerated with 4 lbs. (dry weight) of sodium hydroxide per cubic foot of media, with the sodium hydroxide at a concentration of 4%, and at a flow rate of about 0.5 gallons per minute per cubic foot of media.

Following the sodium hydroxide regeneration, the media is rinsed with at least 3 media volumes of water, and neutralized with dilute hydrochloric acid until the effluent pH is <8. In this neutralization step, it is desirable to keep the pH of the dilute hydrochloric acid to a value greater than about 3.5, since pH values below 3.5 may dissolve and remove the ferric hydroxide. Regeneration of the LayneRT media can be performed off-site (e.g., remote from the wastewater recycling system), and the wastes neutralized and discharged to a municipal sewer.

The adsorbent 402 can be omitted from the filtration subsystem 206 if desired. However, inclusion of the adsorbent 402 can reduce the frequency of salt-rejecting membrane filter 404 cleaning cycles.

Preliminary membrane filter permeate, either after treatment by the adsorbent or with no intervening adsorbent, is next treated by reverse osmosis (RO) or nanofiltration (NF) by the salt-rejecting membrane filter. NF is similar to reverse osmosis, but is distinguished from it by having somewhat lower salt rejection, and much higher rejection of divalent ions like calcium and sulfate, compared to monovalent ions like sodium, chloride or bicarbonate. NF also has good rejection of organic molecules that have a molecular weight>200 Daltons. The NF is also a positive physical barrier to bacteria, viruses and cysts, the second such barrier in the wastewater recycling system. Having two such barriers provides an added degree of redundancy and robustness to the wastewater recycling system.

The salt-rejecting membrane filter 404 can have spiral wound membranes and can be operated in a crossflow mode. In addition to the feed water flow and permeate flow, there is also a continuous concentrate flow. Most of the dissolved salts and organic molecules in the feed water do not pass through the membrane into the salt-rejecting membrane filter permeate; rather they are concentrated and leave the salt-rejecting membrane filter 404 in the concentrate flow. Salt-rejecting membrane filter permeate is sent forward through the wastewater recycling system (e.g., to the post-filtration subsystem) and ultimately becomes the finished product water. Salt-rejecting membrane filter concentrate flow is recirculated upstream through the concentrate recirculation conduit 442 to form a salt concentration loop. If desired, a portion of the salt-rejecting membrane filter concentrate can also be recirculated to the biological treatment system (e.g., to the equalization/anaerobic chamber 302) to further break down organic molecules in the concentrate and also to remove the nitrate ions that are present in the concentrate.

The salt-rejecting membrane filter 404 can be cleaned periodically, via mechanical cleaning and/or chemical cleaning by the chemical cleaning system 408. Based upon the type of fouling, (organic or inorganic) a cleaning solution for the salt-rejecting membrane filter 404 can be either be alkaline for organic or biological foulants, or acid for inorganic foulants (e.g., calcium carbonate and iron). Like the preliminary membrane filter cleaning cycle, the salt-rejecting membrane can be cleaned in place by a fully automated process (e.g., initiated by the controller 106 in FIG. 1). The automated cleaning cycle can be either an alkaline cycle or an acid cycle, or a combination of both. For example, an alkaline cycle followed by an acid cycle if both are used.

When an automated cleaning cycle is initiated, the normal flow of water through the wastewater recycling system is stopped, and the proper chemical is sent to the salt-rejecting membrane filter 404 membranes and housings until they are completely filled with the cleaning solution. Much like in the preliminary membrane filter 400 cleaning, the cleaning chemical can be drawn from a concentrate reservoir and diluted to the proper strength by an eductor 410. However, unlike the preliminary membrane filter 400 cleaning cycle, the cleaning solution is fed to the salt-rejecting membrane filter 404 membranes in the same direction as the normal feed flow. The reason for this is that NF membranes, for example, cannot tolerate more than a few psi of pressure in the reverse direction, otherwise the membrane may delaminate from its backing and be ruined. After the cleaning solution fills the membrane and housing, it is allowed to soak, for example for one or more hours. At the end of the soak, the solution is flushed from both the concentrate and the permeate sides of the membrane and recycled to the biological reactor (e.g., to the equalization/anaerobic chamber 302—FIGS. 3-4) as cleaning waste liquid. The cleaning waste liquid from the salt-rejecting membrane filter 404 can be recycled through common waste conduits that are also used to recirculate cleaning waste from the preliminary membrane filter 400, or the salt-rejecting membrane filter can utilize one or more dedicated waste conduits 446b that are separate from those of the preliminary membrane filter.

The chemistries used for cleaning the preliminary membrane filter 400 and the salt-rejecting membrane filter 404 are compatible with the wastewater recycling system. In the case of an alkaline cleaning cycle, the chemical make-up of the cleaning solution for cleaning the salt-rejecting membrane filter 404 can be the same as the cleaning solution for cleaning the preliminary membrane filter 400. In the case of an acid cleaning for the salt-rejecting membrane filter 404, a food grade citric acid plus a biodegradable detergent can be used. The detergent can be the same detergent used to clean the preliminary membrane filter 400, or a different detergent. An example citric acid concentration for the acid cleaning solution is 12 g/L. Citric acid at this concentration has a pH of about 2.2, and at this pH any calcium or iron deposits are rapidly dissolved. The citric acid is easily treated within the biological reactor 300 (FIGS. 3-4) by the biological treatment system and is converted to carbon dioxide and water.

In recirculating concentrate flow from the salt-rejecting membrane filter 404 through the salt concentration loop, the concentrate can pass through the salt removal device 406. The salt removal device 406 precipitates or otherwise filters salts from the concentrate. For example, the salt removal device can precipitate calcium from the concentrate as calcium carbonate. The salt removal device 406 can be an electrochemical device (e.g., a device having an electrochemical cell). Example electrochemical devices include electrodeionization (EDI) devices, electrodialysis (ED) devices, electrodialysis reversal (EDR) devices, and the like. Example EDI devices are discussed in US patent application publication no. 2011/0042214 published on Feb. 24, 2011 and titled ELECTROREGENERATION APPARATUS AND WATER TREATMENT METHOD (incorporated herein by reference); U.S. patent application Ser. No. 13/364,540 filed on Feb. 2, 2012 and titled ELECTROCHEMICALLY REGENERATED WATER DEIONIZATION (incorporated herein by reference); U.S. provisional patent application No. 61/642,046 filed May 3, 2012 and titled HARDNESS REDUCTION APPARATUS AND METHOD (incorporated herein by reference); and U.S. provisional patent application No. 61/669,773 filed Jul. 10, 2012 and titled HARDNESS REDUCTION APPARATUS AND METHOD (incorporated herein by reference).

The salt-removal device 406 can include an RO device to filter and further concentrate salts found in the salt-rejecting membrane filter concentrate. Concentrate from such an RO device can be discharged from the wastewater recycling system as waste, with the permeate recirculated to form the salt concentration loop. An antiscalant can be added to the flow through the RO device to prevent scaling by silica, calcium fluoride and/or calcium carbonate. The antiscalant can be approved for use on potable water. An example antiscalant is VITEC 4000 manufactured by Avista Technologies of San Marcos, Calif.

If the concentration of calcium and bicarbonate ions in the salt-rejecting membrane filter concentrate rises too high, it can precipitate and foul the membranes of the filter. This fouling reduces the permeate flux and also decreases the quality of the permeate with regard to salt concentration. The fouling can be removed by acid cleaning, however, it is desirable to keep the concentrations of calcium and bicarbonate below the point where scaling can occur and thereby reduce the frequency of cleanings. The need to remove calcium from the salt-rejecting membrane filter concentrate will vary from location to location. For example, it can be desirable to include the salt removal device 406 in systems that use "hard" make-up water. If the make-up water is "soft" or softened, then the salt removal device 406 can be eliminated from the wastewater recycling system. However, even if soft make-up water is added to the system, there can still be a build-up of salts within the system that must eventually be addressed (e.g., by removing liquids and/or solids from the system).

Figure 7:
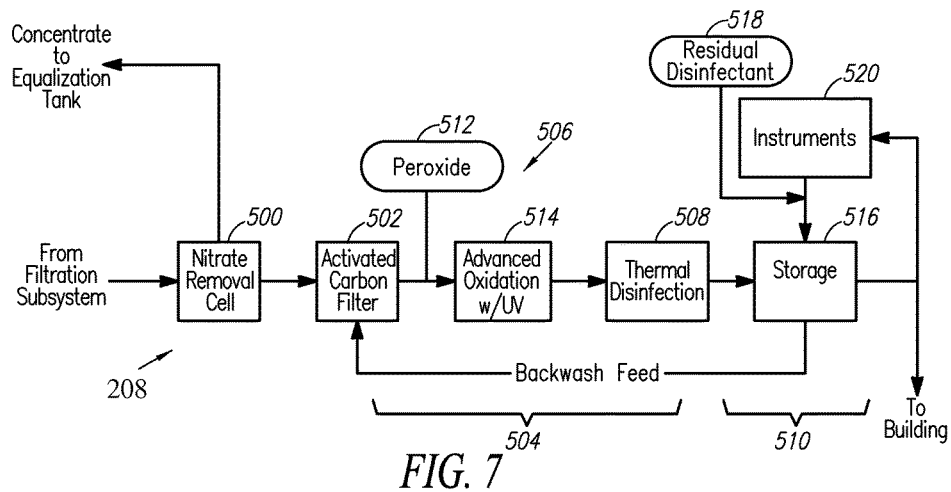
FIG. 7 is a schematic block diagram of a portion of the example wastewater recycling system.

Turning to FIG. 7, salt-rejecting membrane filter permeate is disinfected by the post-filtration subsystem 208 to generate potable water that is returned to the building 100 (FIG. 1) for consumption. The example post-filtration subsystem 208 shown in FIG. 7 includes a nitrate remover 500, an adsorbent or activated carbon filter 502, a water disinfection system 504, and a residual disinfection and storage system 510.

To summarize the operation of the post-filtration subsystem 208, salt-rejecting membrane filter permeate passes through an optional nitrate remover 500 (e.g., an electrochemical cell) that concentrates nitrates in the salt-rejecting membrane filter permeate. The concentrated nitrates can be recycled to the biological reactor 300 (FIGS. 3-4) and broken down in the anoxic chamber 306, which performs denitrification. From the nitrate remover 500, the salt-rejecting membrane filter permeate passes through an adsorbent or activated carbon filter 502 that further removes organic compounds from the water. The water is then disinfected by the water disinfection system 504. The water disinfection system 504 can include an advanced oxidation system 506, a thermal disinfection system 508, a sodium hypochlorite treatment, ozone treatment, etc. After disinfection by the water disinfection system 504, the water is potable and is stored in a residual disinfection and storage system 510 for eventual consumption.

In an example post-filtration subsystem 208, salt-rejecting membrane filter permeate passes directly to the adsorbent or activated carbon filter 502, without passing through the nitrate remover 500. In another example post-filtration subsystem 208, the water disinfection system 504 includes the advanced oxidation system 506, but lacks the additional thermal disinfection system 508.

A more detailed discussion of the operation of the post-filtration subsystem 208 is provided below.

As noted above, salt-rejecting membrane filter permeate can be treated by a nitrate remover 500 that concentrates nitrates in the permeate. The nitrate remover 500 can be an electrochemical device, similar to the salt removal device 406 (FIG. 6). The nitrates that are concentrated by the nitrate remover can be recycled to the biological reactor 300 (FIG. 4) to be biologically treated and broken down in the anoxic chamber 306, which performs denitrification. The wastewater recycling system can include appropriate piping, pumps, etc. to recycle the concentrated nitrates to the equalization/anaerobic chamber 302. In the anoxic chamber 306, nitrates are converted to nitrogen gas and are thereby removed from the water with no residual solid or liquid waste.

After treatment by the nitrate remover 500, the water passes through an adsorbent or activated carbon filter 502. At this point in the wastewater treatment process, nearly all of the organic molecules with a molecular weight greater than 200-300 Daltons have been removed by the salt-rejecting membrane filter 404 (FIG. 6). Permeate from the salt-rejecting membrane filter 404 has <1 mg/L of Total Organic Carbon (TOC). Typically the TOC concentration is 0.4 to 0.6 mg/L at this point in the system. The adsorbent or activated carbon filter 502 can be expected to remove 20-60% of the TOC in the water being fed to it.

Typically, adsorption is somewhat flow sensitive, and a long contact time with the carbon can be desirable. The adsorbent or activated carbon filter 502 can include a sufficient amount of carbon to result in a contact time of >15 minutes. Over time, the carbon will become exhausted and need to be replaced with either new or re-activated carbon.

An example activated carbon for use in the filter 502 is F-300 (FILTRASORB 300) carbon available from Calgon Corporation of Pittsburgh, Pa. F-300 carbon was found to be economical in terms of cost per gallon treated.

With the long contact time (>15 minutes) and a concentration of 1 mg/L of TOC, the activated carbon should last for 14,000 bed volumes. If the TOC concentration were 1 mg/L, then 1 cubic foot of the carbon could treat 104,700 gallons of water. The TOC concentration at the input to the adsorbent or activated carbon filter 502 is less than 1 mg/L, so a much greater volume could be treated before carbon replacement is required. One cubic foot of carbon could last for well over a year before replacement is needed. The carbon can be replaced on an annual basis, if desired.

It can be seen in FIG. 7 that the water is treated by the adsorbent or activated carbon filter 502 before being disinfected by the advanced oxidation system 506. Advanced oxidation oxidizes organic molecules, and can convert a non-ionic organic molecule into an ionic one. Activated carbon adsorbs non-ionic organic molecules more strongly than ionic molecules. Thus, if activated carbon treatment is to be applied, it can be beneficial to locate the adsorbent or activated carbon filter 502 "upstream" of the advanced oxidation system 506.

The advanced oxidation system 506 is operatively connected to receive the salt-rejecting membrane filter permeate after it has been treated by the nitrate remover 500 and/or the adsorbent or activated carbon filter 502. In certain embodiments, the advanced oxidation system 506 includes an oxidizing agent injector 512 that adds an oxidizing agent (e.g., hydrogen peroxide, ozone, sodium hypochlorite, etc.) to the water. The advanced oxidation system 506 further includes an ultraviolet (UV) light generator that irradiates the oxidizing agent in the water, thereby producing hydroxyl radicals in the water. UV light alone would cause some organic molecules to break apart by photolysis and would disinfect the water. However, advanced oxidation produces hydroxyl radicals, which have a stronger oxidizing power than peroxide, or chloride, or even ozone. This is shown in the following formula, where HOOH represents hydrogen peroxide, hu represents a photon of the proper wavelength, and HO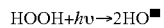 represents a hydroxyl radical:

$$HOOH + h\upsilon \rightarrow 2HO^\bullet$$

Hydroxyl radicals are extremely reactive, and therefore short-lived. They react with the first oxidizable molecule that they come into contact with. Given enough time, peroxide and UV light, the free radicals could oxidize and breakdown hydrocarbons all the way to carbon dioxide and water. This process is called mineralization. However, while this occurs to some extent, complete mineralization is not practical. In the wastewater recycling system discussed herein, the function of the advanced oxidation step is to break down potentially harmful organic molecules that may be present and convert them into benign forms. Molecules that fall into this category include disinfection by-products like trihalomethanes and chlorinated organic compounds, residues from pharmacological products such as estradiol, ibuprofen, endocrine disruptors, and residual molecules from personal care products. Studies have shown that many of these compounds are not fully treated by biological treatment and remain in the treated water in minute amounts. Further, these compounds have been detected in drinking water. The combination of RO or NF membranes and advanced oxidation can provide an effective system to detoxify and/or remove such compounds from water.

Various UV light generators emit light at different wavelengths. One example UV light generator 514 uses low pressure mercury lamps that emit light at wavelengths from 250-260 nanometers. Such lamps are most commonly used in smaller water disinfection systems. A minor amount of light is also emitted in the 180-190 nanometer wavelength range. The glass that most UV disinfection lamps are made of blocks light with a wavelength that is less than about 200 nanometers. However, there are also lamps that are made with a glass that does not block the light with 180-190 nanometer wavelengths, and such lamps are typically used for TOC reduction. The reason for this is that, in the presence of dissolved oxygen, water that is irradiated with UV light below 200 nm can form ozone. Ozone in combination with either UV light alone or by reaction with peroxide alone can also form hydroxyl radicals, and therefore also assists in reducing the TOC. The advanced oxidation system 506 can employ standard UV disinfection lamps with a nominal output of 254 nm light in combination with an oxidizing agent such as hydrogen peroxide or ozone. However, TOC reduction lamps, which also allow light with a nominal wavelength of 185 nm to irradiate the water, will in principle create more hydroxyl radicals. Testing showed that peroxide was consumed 1.7 times faster with 185 nm lamps that it was with 254 nm lamps of the same wattage, which is believed to be due to faster oxidation and a higher rate of free radical generation. In certain embodiments, the advanced oxidation system 506 employs 185 nm lamps without the addition of an oxidizing agent, wherein the 185 nm lamps themselves create ozone from dissolved oxygen in the water.

Other variables in the advanced oxidation step include the concentration of the oxidizing agent (e.g., hydrogen peroxide) and the dosage of UV light. An example concentration of hydrogen peroxide is >5 and <10 mg/L before being irradiated. Lamps that are sold for disinfection are normally rated for flow rate and a minimum specific dosage of UV light, usually specified in millijoules per square centimeter (mJ/cm$^2$). An example minimum specific dosage of UV light is 40 mJ/cm$^2$. This dosage is sufficient for disinfection, but is considered to be much lower than the dose required for advanced oxidation. Typical dosages for advanced oxidation are 5-15 times the disinfection dosage, or even higher. In order to achieve the higher dosage and to use readily available, low cost lamps, water can be sent through the UV light generator 514 at a much slower flow rate than the generator is rated for. For example, if a lamp is rated for disinfection service at 27 gallons per minute (gpm), water can be passed through it at a flow rate of only 0.4 to 2 gpm in order to increase the total dosage of UV light given to the water.

The post-filtration subsystem 208, in particular the disinfection system 504, can further include a thermal disinfection system 508 that thermally disinfects liquid processed by the advanced oxidation system 506. The thermal disinfection system can include a Pasteurization process (e.g., at 185° F. or less for a specific contact time) or the use of superheated, pressurized water at temperatures above 212° F. for a specific contact time.

After disinfection by the water disinfection system 504, the water is potable and is stored in a residual disinfection and storage system 510 for eventual consumption. Water is stored in a water storage tank 516 (e.g., a bladder tank) for recirculation back to the building 100 (FIG. 1). Sodium hypochlorite 518 can be added to the water for residual disinfection, thereby creating residually disinfected potable water that is stored in the water storage tank 516. The chlorine concentration in the stored water can be maintained between 0.5 and 1.5 mg/L at all times, with a preferred range of 0.9-1.2 mg/L. The stored water can be continuously monitored for chlorine concentration by a chlorine analyzer and/or monitored by other instrumentation 520. For example, a TOC analyzer could be used to monitor TOC in the finished water. The instrumentation can provide one or more signals to the controller 106 (FIG. 1), so that the controller 106 can monitor the quality of the finished water.

As shown in FIG. 3, the wastewater recycling system can include a pressurization system 540 having a pump 542 for distributing the potable water to the building 100 and for recirculating clean water to the wastewater recycling system (e.g., to flush and clean the membrane filters in the filtration subsystem).

Conventional municipal water systems average between 300 and 3,000 µg/L of TOC. The wastewater treatment and recycling system discussed above has been shown to produce potable water with less than 150 µg/L of TOC. The wastewater treatment and recycling system has been shown to produce potable water with less than 100 µg/L of TOC, often with less than 50 µg/L of TOC. Such results were unexpected (i.e., the obtained TOC levels were unexpectedly low), given that the untreated wastewater recycled by the present system typically has a TOC of 100,000 to 400,000 µg/L. Further, the wastewater recycling system is capable of recycling at least 80% of the wastewater in the system, including both "gray water" and "black water", into clean, potable water. For example, the wastewater recycling system is capable of recycling at least 90% of the wastewater in the system into potable water. In certain embodiments, the wastewater recycling system is capable of recycling at least 95% of the wastewater in the system into potable water. It is expected that the wastewater recycling system could be capable of recycling at least 98% of the wastewater in the system into potable water.

It is to be appreciated that the wastewater recycling system discussed above can be operated with no continual discharge from the system. Membrane concentrates and membrane cleaning solutions are recycled internally. There would be an eventual build-up of inorganic salts that are added to the system by human activities. Such build-up would be removed periodically (e.g., every few weeks). Conversely, conventional systems typically discharge filter concentrates and flush volumes, rather than recycle them as in the present system.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A wastewater recycling system, comprising:
   a) a biological reactor the biological reactor comprising an anaerobic chamber, an anoxic chamber, and an aerobic chamber;
   b) a lift station comprising a lift station pump, wherein the lift station is operatively connected to the biological reactor to receive biologically treated liquid from the biological reactor and pump the biologically treated liquid from the lift station pump;
   c) a filtration subsystem, operatively connected to the lift station, that receives and filters the biologically treated liquid pumped by the lift station, the filtration subsystem comprising:
      i) a salt-rejecting membrane filter;
      ii) a concentrate recirculation conduit operatively connected to recirculate salt-rejecting membrane filter concentrate to a point along the wastewater recycling system upstream of the salt-rejecting membrane filter and downstream of the anaerobic chamber, the anoxic chamber, and the aerobic chamber, thereby forming a salt concentration loop between said point along the wastewater recycling system and the salt-rejecting membrane filter, wherein said point is the lift station;
      iii) a preliminary membrane filter operatively connected to the salt rejecting membrane filter so as to supply preliminary membrane filter permeate to the salt-rejecting membrane filter for further filtering by the salt-rejecting membrane filter;
      iv) a salt removal device operatively connected to receive the salt-rejecting membrane filter concentrate, wherein the salt removal device is adapted to remove salts from the salt-rejecting membrane filter concentrate; and
   d) a post-filtration subsystem operatively connected to receive salt-rejecting membrane filter permeate, wherein the post-filtration subsystem comprises a water disinfection system that disinfects the salt-rejecting membrane filter permeate.

2. The wastewater recycling system of claim 1, wherein:
   i) the anaerobic chamber is operatively connected to supply liquid to the anoxic chamber, and the anaerobic chamber is adapted for anaerobically treating wastewater within the anaerobic chamber,
   ii) the anoxic chamber is operatively connected to receive liquid from both of the anaerobic chamber and the aerobic chamber, wherein the anoxic chamber is adapted for anoxically treating the liquid received from both of the anaerobic chamber and the aerobic chamber within the anoxic chamber thereby biologically removing nitrates from the liquid treated within the anoxic chamber, and
   iii) the aerobic chamber is operatively connected to recirculate aerobically treated liquid to the anoxic chamber.

3. The wastewater recycling system of claim 1, wherein the water disinfection system comprises an advanced oxidation system operatively connected to receive the salt-rejecting membrane filter permeate, wherein the advanced oxidation system produces hydroxyl radicals within the salt-rejecting membrane filter permeate.

4. The wastewater recycling system of claim 3, wherein the advanced oxidation system is configured to add an oxidizing agent to the salt-rejecting membrane filter permeate, and the advanced oxidation system comprises an ultraviolet light generator that irradiates the oxidizing agent within the salt-rejecting membrane filter permeate.

5. The wastewater recycling system of claim 4, wherein the ultraviolet light generator comprises a 185 nm lamp.

6. The wastewater recycling system of claim 1, wherein the filtration subsystem further comprises:
   v) a chemical cleaning subsystem operatively connected to the salt-rejecting membrane filter and configured to expose the salt-rejecting membrane filter to a cleaning solution, thereby producing a cleaning waste liquid, and wherein the chemical cleaning subsystem comprises a waste conduit operatively connected to recirculate the cleaning waste liquid to the biological reactor for biological treatment in the biological reactor.

7. The wastewater recycling system of claim 6, wherein the cleaning solution is acidic and comprises citric acid and a biodegradable detergent.

8. The wastewater recycling system of claim 1, wherein the preliminary membrane filter concentrate is recirculated to the lift station.

9. The wastewater recycling system of claim 1, wherein the filtration subsystem further comprises:
   v) an adsorbent, operatively connected between the preliminary membrane filter and the salt-rejecting membrane filter so as to receive the preliminary membrane filter permeate, wherein the adsorbent is adapted for removing organic molecules from the preliminary membrane filter permeate prior to filtration of the preliminary membrane filter permeate by the salt-rejecting membrane filter.

10. The wastewater recycling system of claim 1, wherein the salt-rejecting membrane filter comprises a nanofilter.

11. The wastewater recycling system of claim 1, wherein the salt-rejecting membrane filter comprises a reverse osmosis device.

12. The wastewater recycling system of claim 1, wherein the preliminary membrane filter comprises an ultrafilter.

13. The wastewater recycling system of claim 1, wherein the preliminary membrane filter comprises a microfilter.

14. The wastewater recycling system of claim 1, wherein the salt removal device is an electrochemical device.

15. The wastewater recycling system of claim 1, wherein the biological reactor comprises a biologically-active tertiary filter operatively connected to receive aerobically treated liquid from the aerobic chamber, and the tertiary filter filters and biologically treats the aerobically treated liquid from the aerobic chamber, and wherein the biological reactor comprises a tertiary filter backwash conduit operatively connected to recirculate tertiary filter backwash to the anaerobic chamber.

16. A method of recycling wastewater through a system comprising
   a biological reactor,
   a lift station,
   a salt-rejecting membrane filter,
   a preliminary membrane filter, and
   a salt removal device,
   wherein the biological reactor comprises an anaerobic chamber, an anoxic chamber, and an aerobic chamber, the method comprising the steps of:
   biologically treating the wastewater in the biological reactor, thereby generating biologically treated liquid;
   pumping the biologically treated liquid from the biological reactor by the lift station;
   filtering the biologically treated liquid that has been pumped by the lift station through a salt-rejecting membrane filter;
   recirculating salt-rejecting membrane filter concentrate to a point along the system upstream of the salt-rejecting membrane filter, wherein said point is the lift station, and downstream of the anaerobic chamber, the anoxic chamber, and the aerobic chamber, thereby forming a salt concentration loop between said point along the system and the salt-rejecting membrane filter;
   filtering the biologically treated liquid through the preliminary membrane filter prior to filtering the biologically treated liquid through the salt-rejecting membrane filter;
   removing, by the salt removal device, salts from a flow stream through the salt concentration loop; and
   disinfecting salt-rejecting membrane filter permeate thereby generating potable water.

17. The method of claim 16, wherein the system further comprises a potable water storage tank, the method further comprising the step of storing the potable water in the potable water storage tank.

18. The method of claim 16, further comprising the steps of:
   transferring liquid from the anaerobic chamber into the anoxic chamber;
   recirculating liquid from the aerobic chamber into the anoxic chamber;
   anoxically treating liquid in the anoxic chamber thereby biologically removing nitrates from the liquid treated within the anoxic chamber; and
   aerobically treating liquid within the aerobic chamber.

19. The method of claim 18, wherein the aerobic chamber is a second aerobic chamber, the biological reactor further comprising a first aerobic chamber, the method further comprising the steps of:
   transferring liquid from the anoxic chamber into the first aerobic chamber; and
   transferring liquid from the first aerobic chamber into the second aerobic chamber.

20. The method of claim 16, wherein the step of disinfecting the salt-rejecting membrane filter permeate comprises generating hydroxyl radicals within the salt-rejecting membrane filter permeate.

21. The method of claim 20, wherein the step of disinfecting the salt-rejecting membrane filter permeate comprises adding an oxidizing agent to the salt-rejecting membrane filter permeate and irradiating the oxidizing agent in the salt-rejecting membrane filter permeate with ultraviolet light.

22. The method of claim 21, wherein total organic carbon in the potable water is less than 150 µg/L.

23. The method of claim 21, wherein total organic carbon in the potable water is less than 100 µg/L.

24. The method of claim 16, further comprising the steps of:
   chemically cleaning the salt-rejecting membrane filter with an acidic solution, thereby producing a cleaning waste liquid; and
   recirculating the cleaning waste liquid to the biological reactor for biological treatment in the biological reactor.

25. The method of claim 16, further comprising the step of removing, by an adsorbent, organic molecules from preliminary membrane filter permeate prior to filtration of the preliminary membrane filter permeate by the salt-rejecting membrane filter.

26. The method of claim 16, wherein the salt removal device is an electrochemical device.

27. The method of claim 16, wherein at least 80% of the wastewater is recycled into potable water.

28. The method of claim 27, wherein at least 90% of the wastewater is recycled into potable water.

29. The method of claim 28, wherein at least 95% of the wastewater is recycled into potable water.

\* \* \* \* \*